United States Patent
Dobrinin et al.

(10) Patent No.: US 11,292,542 B2
(45) Date of Patent: Apr. 5, 2022

(54) INDEPENDENTLY HEATED HANDGRIPS FOR A MOTORCYCLE

(71) Applicant: Harley-Davidson Motor Company Group, LLC, Milwaukee, WI (US)

(72) Inventors: Nikita Dobrinin, Glendale, WI (US); Nathan Gugliotti, Jackson, WI (US); Benjamin Hynes, Brookfield, WI (US); Anthony Langeweg, Glendale, WI (US); Steven E. Twining, Richfield, WI (US); Andrew Alfred Knitt, Oconomowoc, WI (US); Robert Kenneth Alexander, Jackson, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 423 days.

(21) Appl. No.: 16/403,823

(22) Filed: May 6, 2019

(65) Prior Publication Data

US 2019/0256161 A1    Aug. 22, 2019

Related U.S. Application Data

(63) Continuation-in-part of application No. 16/181,706, filed on Nov. 6, 2018, now Pat. No. 11,066,120.
(Continued)

(51) Int. Cl.
*B62J 33/00* (2006.01)
*B62K 21/26* (2006.01)

(52) U.S. Cl.
CPC .............. *B62J 33/00* (2013.01); *B62K 21/26* (2013.01)

(58) Field of Classification Search
CPC ........... B62K 21/26; B62J 33/00; B62J 25/08; H05B 1/0236; H05B 2203/035; H02M 5/2573
See application file for complete search history.

(56) References Cited

U.S. PATENT DOCUMENTS 5,613,407 A    3/1997  Ogata
5,735,037 A    4/1998  Ogata
(Continued)

FOREIGN PATENT DOCUMENTS

DE    202005013294 U1    11/2005
DE       10048181 B4     8/2011
(Continued)

OTHER PUBLICATIONS

Office Action issued from the United States Patent Office for related U.S. Appl. No. 16/181,706 dated Oct. 6, 2020 (6 Pages).

*Primary Examiner* — Shawntina T Fuqua
(74) *Attorney, Agent, or Firm* — Michael Best & Friedrich LLP

(57)  ABSTRACT

Systems and methods for heating a handgrip of a vehicle. One system includes a first handgrip and a second handgrip. The first handgrip includes a first processor, a first heating element, and a first temperature sensor configured to produce a temperature signal indicative of a temperature related to the first heating element. The second handgrip includes a second processor, second heating element, and a second temperature sensor configured to produce a temperature signal indicative of a temperature related to the second heating element. The first processor is configured to receive a temperature signal from the first sensor, compare the signal to a first threshold, and adjust power supplied to the first element based on the signal. The second processor is configured to receive a second temperature signal from the second sensor, compare the signal to a second threshold, and adjust power supplied to the second element based on the signal.

20 Claims, 11 Drawing Sheets

Related U.S. Application Data

(60) Provisional application No. 62/581,951, filed on Nov. 6, 2017.

(56) References Cited

U.S. PATENT DOCUMENTS

| | | | |
|---|---|---|---|
| 5,834,734 A | 11/1998 | Ogata | |
| 6,844,524 B2 | 1/2005 | Downey et al. | |
| 6,903,312 B2 | 6/2005 | Miura et al. | |
| 6,927,367 B2 | 8/2005 | Livingstone | |
| 6,984,807 B2 | 1/2006 | Richlen | |
| 7,010,997 B2 | 3/2006 | Dzurnak | |
| 7,119,304 B2 | 10/2006 | Meyers | |
| 7,189,943 B2 | 3/2007 | Richlen | |
| 7,214,906 B1 * | 5/2007 | Hansen | B62J 33/00 219/204 |
| 7,671,299 B2 | 3/2010 | Gifford et al. | |
| 8,558,140 B2 | 10/2013 | Hazlett et al. | |
| 8,725,230 B2 | 5/2014 | Lisseman et al. | |
| 8,983,732 B2 * | 3/2015 | Lisseman | B62D 1/046 701/45 |
| 9,024,236 B2 * | 5/2015 | Kurumagawa | B62K 21/26 219/482 |
| 9,452,725 B2 | 9/2016 | Lorenz et al. | |
| 9,550,541 B2 * | 1/2017 | Lenton | B62K 23/02 |
| 9,738,220 B2 | 8/2017 | Borghi | |
| 9,783,109 B2 | 10/2017 | Keaveny et al. | |
| 9,789,896 B2 | 10/2017 | Evreinov et al. | |
| 9,809,167 B1 | 11/2017 | Badger | |
| 9,908,370 B2 | 3/2018 | Sweney et al. | |
| 9,937,948 B2 | 4/2018 | Oh et al. | |
| 2015/0136754 A1 | 5/2015 | Yester | |
| 2016/0068143 A1 | 3/2016 | Schanz et al. | |
| 2017/0166235 A1 | 6/2017 | Walker | |
| 2017/0291066 A1 | 10/2017 | Le Chevalier et al. | |
| 2018/0056111 A1 | 3/2018 | Chiang et al. | |
| 2018/0065551 A1 | 3/2018 | Chiang et al. | |

FOREIGN PATENT DOCUMENTS

| | | |
|---|---|---|
| DE | 102006046342 B4 | 5/2014 |
| EP | 1445984 A2 | 8/2004 |
| EP | 1285849 B1 | 3/2005 |
| EP | 3076752 A1 | 10/2016 |
| EP | 3219256 A1 | 9/2017 |
| JP | 2015058898 A | 3/2015 |
| JP | 2016215966 A | 12/2016 |
| WO | WO2006102877 A1 | 10/2006 |
| WO | WO2009035794 A1 | 3/2009 |
| WO | WO2012040585 A2 | 3/2012 |
| WO | WO2016006019 A1 | 1/2016 |

* cited by examiner

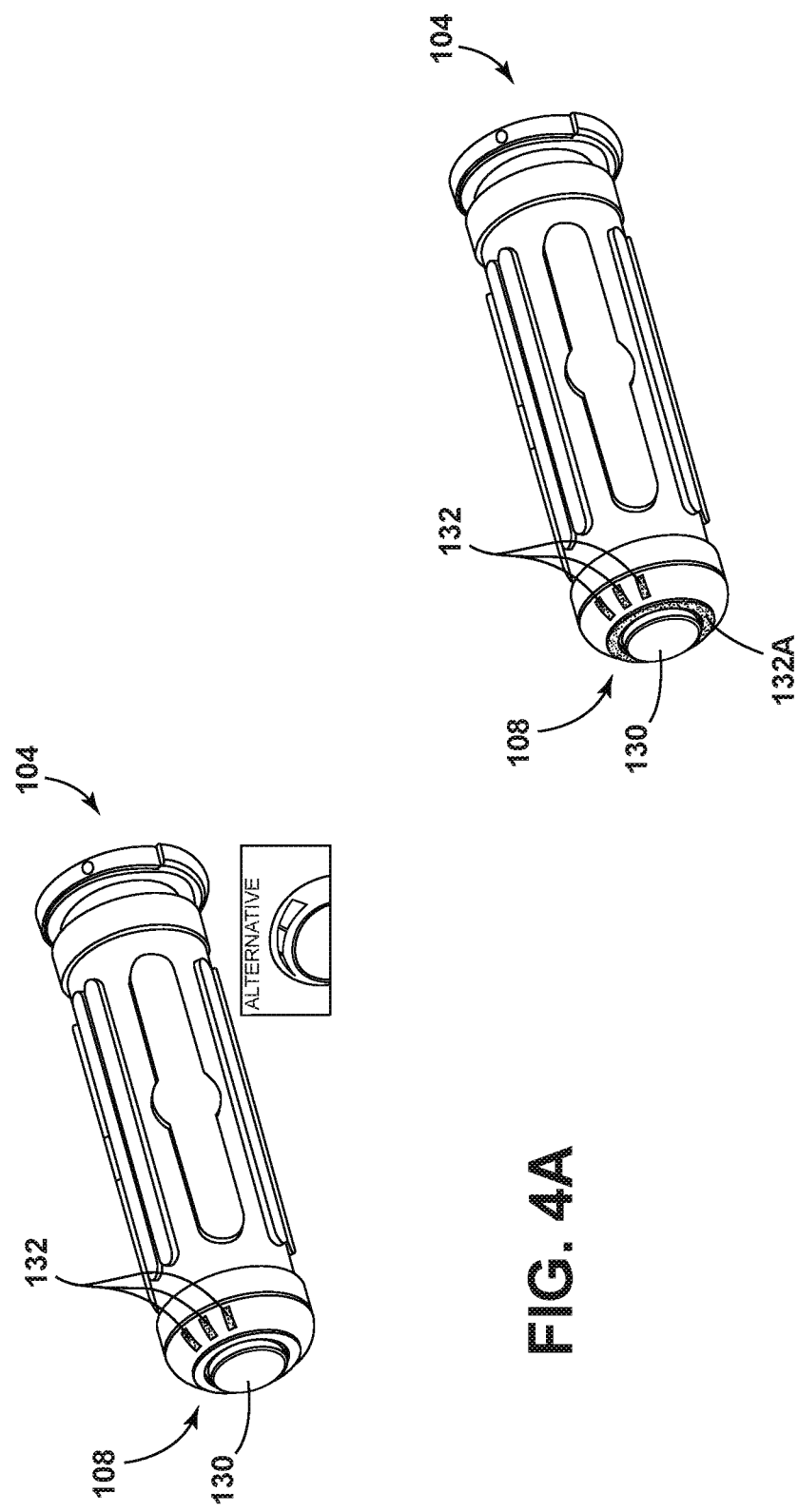

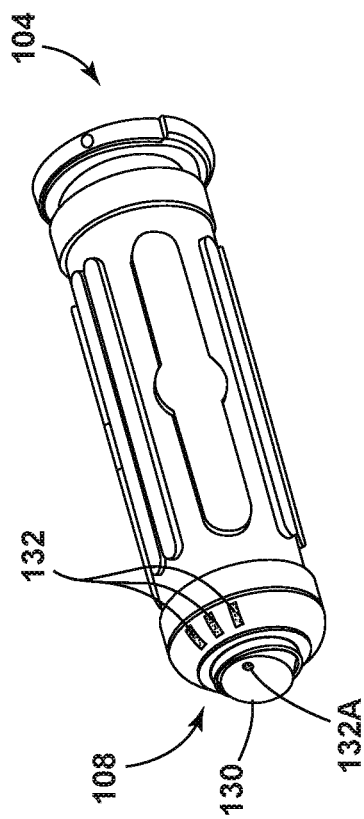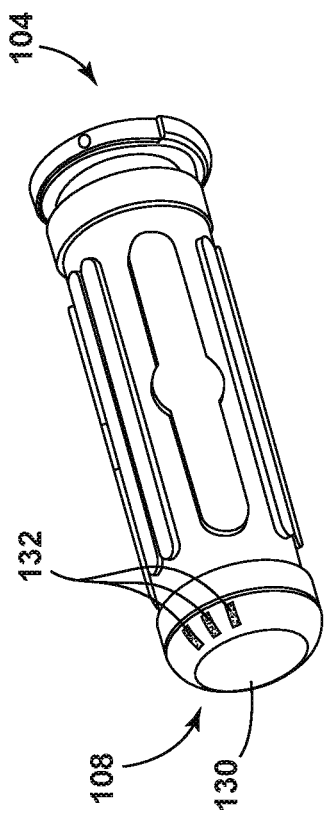
FIG. 4C
FIG. 4D

US 11,292,542 B2

INDEPENDENTLY HEATED HANDGRIPS FOR A MOTORCYCLE

RELATED APPLICATIONS

This application is a continuation-in-part of U.S. patent application Ser. No. 16/181,706 filed on Nov. 6, 2018, which claims priority to U.S. Provisional Patent Application No. 62/581,951, filed on Nov. 6, 2017, the entire contents of both prior-filed applications are incorporated herein by reference.

FIELD

Embodiments described herein relate to systems and methods of providing heat through a steering mechanism of a vehicle, such as the handlebars of a motorcycle.

SUMMARY

Heated handgrips for motorcycles may include a single temperature feedback sensor contained at one location on the handlebars. In some cases, the sensor may be located within one of the handgrips. This setup may present a temperature gradient between the left side grip and the right side grip due to the fact that the temperature of the other grip is unknown.

Accordingly, embodiments described herein provide temperature sensing and heating of a handgrip to solve these and other problems. For example, one embodiment provides a heated handgrip system including a first handgrip and a second handgrip. The first handgrip includes a first electronic processor, a first heating element, and a first temperature sensor configured to produce a first temperature signal indicative of a temperature related to the first heating element. The second handgrip includes a second electronic processor, a second heating element, and a second temperature sensor configured to produce a temperature signal indicative of a temperature related to the second heating element. The first electronic processor is communicatively coupled to the first handgrip and is configured to receive a first temperature signal from the first temperature sensor, compare the first temperature signal to a first predetermined temperature threshold, and adjust power supplied to the first heating element via the first electronic processor based on the comparison of the first temperature signal to the first predetermined threshold. The second electronic processor communicatively coupled to the second handgrip and is configured to receive a second temperature signal from the second temperature sensor, compare the second temperature signal to a second predetermined temperature threshold, and adjust power supplied to the second heating element via the second electronic processor based on the comparison of the second temperature signal and the second predetermined threshold.

Another embodiment provides a method of heating a first handgrip and a second handgrip. The method includes providing power to a first temperature sensor associated with the first handgrip, receiving a first temperature signal from the first temperature sensor, comparing, via a first electronic processor associated with the first handgrip, the first temperature signal to a first predetermined temperature threshold, and adjusting power provided to a first heating element associated with the first handgrip via the first electronic processor based on the comparison of the first temperature signal and the first predetermined temperature threshold. The method further includes providing power to a second temperature sensor associated with the second handgrip, receiving a second temperature signal from the second temperature sensor, comparing, via a second electronic processor associated with the second handgrip, the second temperature signal to a second predetermined temperature threshold, and adjusting power provided to a second heating element associated with the second handgrip via the second electronic processor based on the comparison of the second temperature signal and the second predetermined temperature threshold.

Other aspects will become apparent by consideration of the detailed description and accompanying drawings.

BRIEF DESCRIPTION OF THE DRAWINGS

FIG. 4A illustrates a user interface of the handgrip heating system of FIG. 1 according to some embodiments.

FIG. 4B illustrates a user interface of the handgrip heating system of FIG. 1 according to some embodiments.

FIG. 4C illustrates a user interface of the handgrip heating system of FIG. 1 according to some embodiments.

FIG. 4D illustrates a user interface of the handgrip heating system of FIG. 1 according to some embodiments.

DETAILED DESCRIPTION

Figure 1:
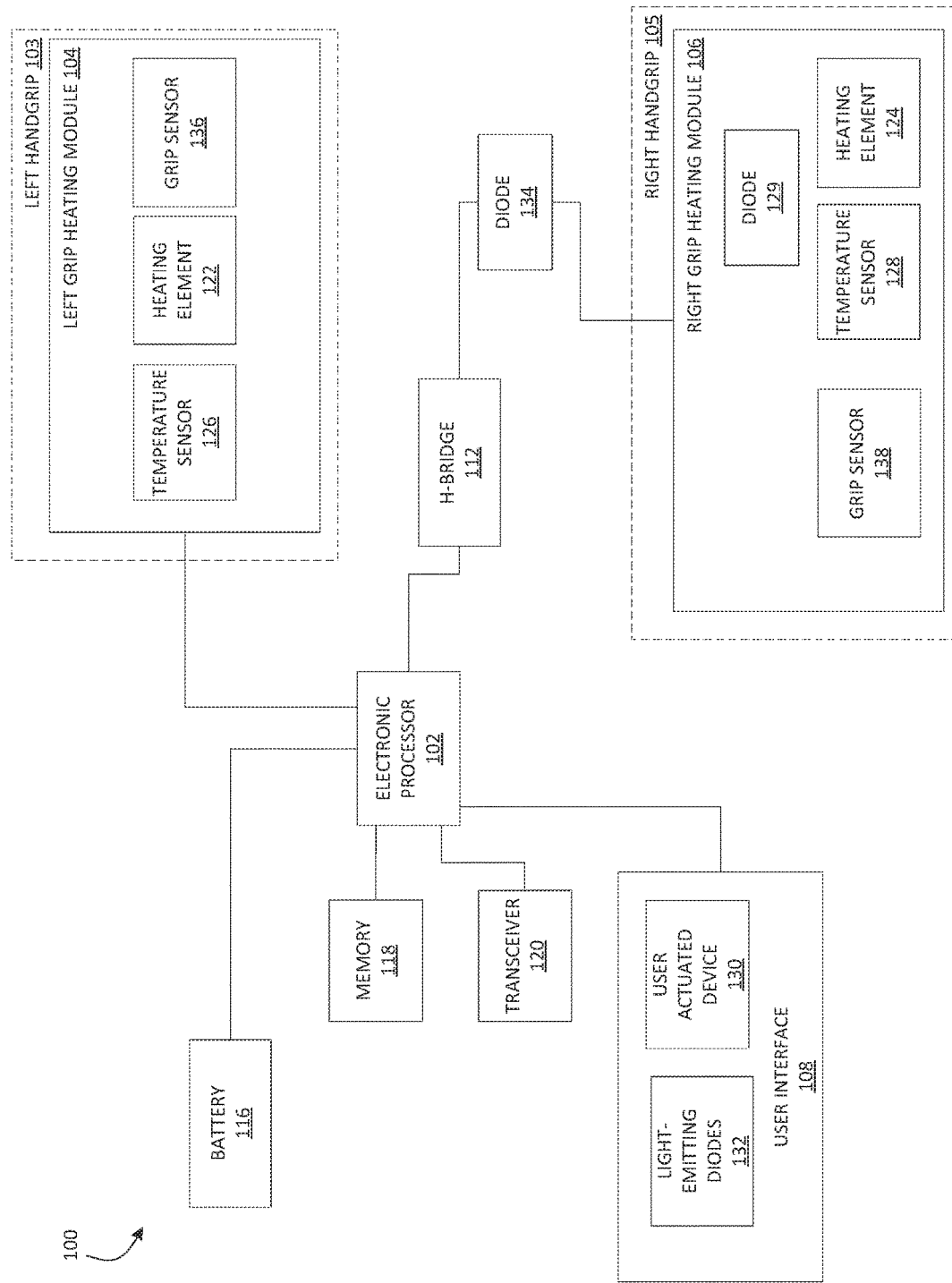
FIG. 1 schematically illustrates a handgrip heating system according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification may include processing components, such as one or more processors, one or more memory modules including non-transitory computer-readable medium, one or more input/output interfaces, and various connections (for example, a system bus) connecting the components. It should be understood that while several elements are referred herein to being associated with a "left" or a "right" handgrip, embodiments described herein are not limited to a steering mechanism or handle with distinct left and right handgrips, and the embodiments described herein can be used with other types of steering mechanisms with other configurations. Also, in various configurations, elements described herein as being included or associated with a left handgrip may be included or associated with a right handgrip or vice versa.

Figure 2:
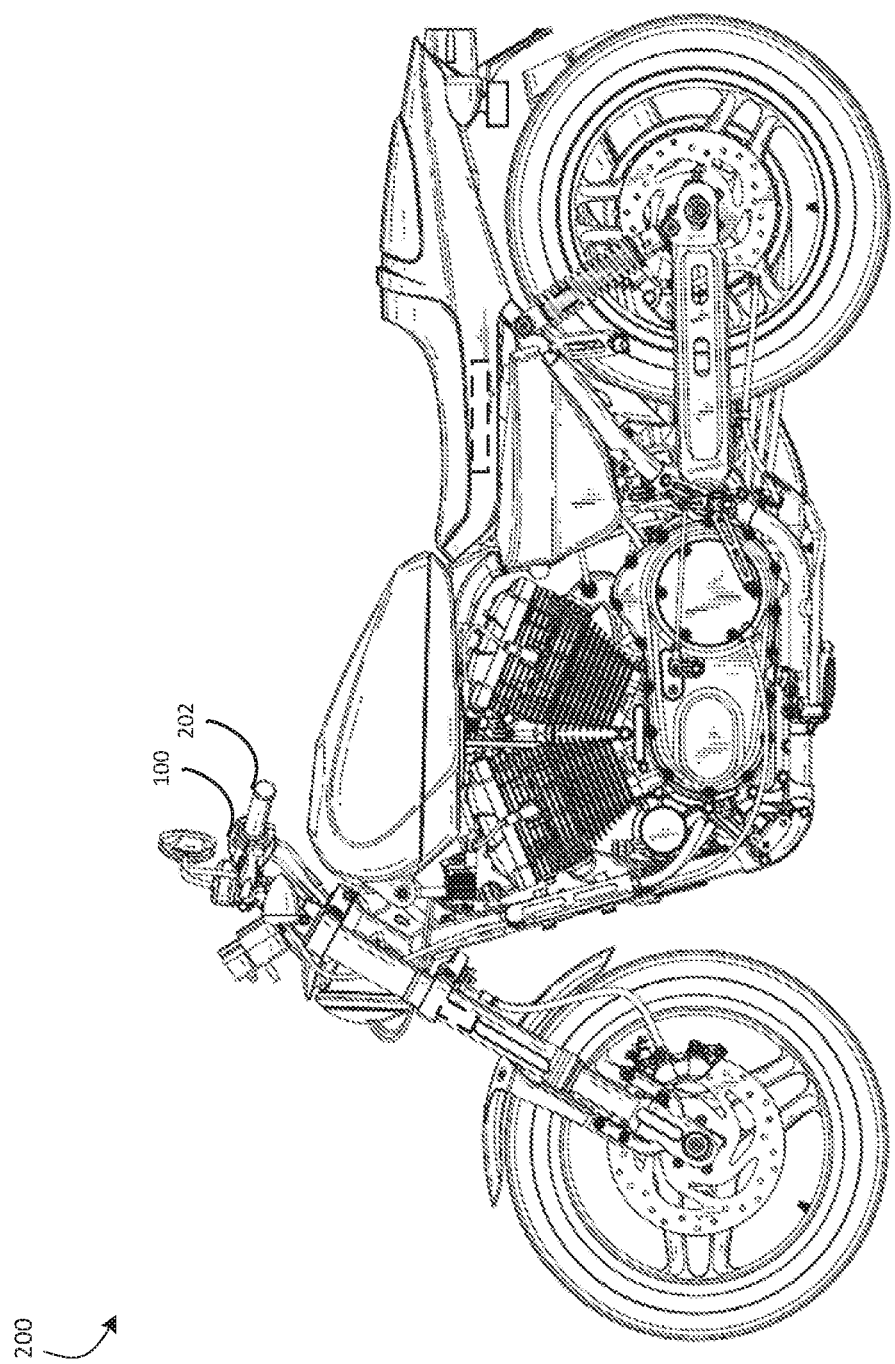
FIG. 2 illustrates a motorcycle system including the handgrip heating system of FIG. 1 according to some embodiments.

FIG. 1 schematically illustrates a handgrip heating system 100. The handgrip heating system 100 includes an electronic processor 102, a first (left) grip heating module 104, a second (right) grip heating module 106, a user interface 108, a polarity switching circuit, such as an H-bridge 112, and a battery 116. In some embodiments, the handgrip heating system 100 further includes a memory 118, a transceiver 120, or both. The electronic processor 102 is coupled (for example, directly) to the left grip heating module 104 and is coupled to the right grip heating module 106 via the H-bridge 112. As illustrated in FIG. 2, the handgrip heating system 100 may be installed onto or integrated into a motorcycle 200 and, in particular, may be positioned onto or within proximity to a handlebar 202 of the motorcycle 200. In some embodiments, the handgrip heating system 100 may be an electronic device attachable to the handlebar 202 of the motorcycle 200. In other embodiments, some of all of the elements of the handgrip heating system 100 are integrated into the handlebar 202 and the motorcycle 200. For example, returning to FIG. 1, in the illustrated embodiment, the left grip heating module 104 is integrated into a left handgrip 103 of a handlebar (for example, the handlebar 202 of FIG. 2), and the right grip heating module 106 is integrated into a right handgrip 105 of a handlebar (for example, the handlebar 202 of FIG. 2). In this configuration, the remaining elements may be housed together within one or more devices coupled to the motorcycle 200, integrated within the motorcycle 200, or some combination thereof.

As illustrated in FIG. 1, the handgrip heating system 100 receives power from the battery 116. In some embodiments, the battery 116 includes a dedicated battery for the handgrip heating system 100. However, in other embodiments, the battery 116 is a battery included in the motorcycle 200 (for powering other components of the motorcycle 200) and may provide electrical power to the handgrip heating system 100 through wiring. For example, when the handgrip heating system 100 is positioned on the handlebar 202 (see FIG. 2), the handgrip heating system 100 may be electrically coupled to wiring running through the handlebar 202 coupled to an electrical system of the motorcycle 200. In some embodiments, the electrical system receives electrical power generated from operation of an internal combustion engine included in the motorcycle 200 (FIG. 2), such as, for example, through an alternator. In some embodiments, the handgrip heating system 100 is configured to (for example, via the electronic processor 102) monitor input voltage and remove power to the heating elements (described below) in response to the voltage exceeding a predetermined amount (for example, 16 VDC) or falling below a predetermined amount (for example, 11 VDC).

The user interface 108 receives input from and optionally provides output to a user of the handgrip heating system 100 to allow the user to interact with the handgrip heating system 100. For example, in some embodiments, the user interface 108 includes one or more user actuated devices 130, such as one or more buttons, switches, bumper switches, toggles, dials, a keypad, a scroll knob, or a combination thereof. The user interface 108 may also include a display device, such as one or more light-emitting diodes (LEDs) 132. Alternatively or in addition, the user interface 108 may include a touchscreen, an LED display, a liquid crystal display (LCD), or a combination thereof. For example, in some embodiments, the user interface 108 is configured to display a graphical user interface (GUI) generated by the electronic processor 102. In some embodiments, such a GUI may be implemented on a portable electronic device separate from the system 100 (for example, a smartphone). For example, in addition to or as an alternative to receiving or outputting information via the user interface 108, a user may execute a software application installed on a separate portable electronic device, such as a smartphone that allows a user to set a temperature, see a current temperature of one or both grips, or a combination thereof. In this configuration, the software application installed on the separate portable electronic device communicates (directly or indirectly over one or more wired or wireless communication networks, such as, for example, the Internet, Bluetooth, WiFi, a cellular network, or the like) with the electronic processor 102 to control and monitor the modules 104 and 106. Accordingly, it should be understood that functionality described herein as being performed by through the user interface 108 may alternatively be performed through a portable electronic device operated by the user that communicates with the system 100.

A user of the handgrip heating system 100 may activate the handgrip heating system 100 and select a temperature setting for the modules 104 and 106 via the user interface 108 (for example, using one or more user actuated devices 130). In some embodiments, the user interface 108 provides a set of predetermined temperature states, wherein each state corresponds to a set temperature or range of temperatures. For example, through the user interface 108, a user may be able to choose from a low temperature setting (for example, approximately 100° F.), a medium temperature setting (for example, approximately 110° F.), and a high temperature (for example, approximately 120° F.). In some embodiments, the temperature or temperatures corresponding to a temperature state may be a preconfigured default or may be customizable by the user. Also, in some embodiments, the temperature setting may be a specific temperature selected by the user. Furthermore, in some embodiments, a temperature setting may be provided for both the right and left grip heating modules 104 and 106. The temperature settings (available settings, selected settings, or a combination thereof) may be stored in a memory local to (for example, the memory 118) or remote from the handgrip heating system 100. The user interface 108 may also indicate a current or present temperature setting. For example, in some embodiments, the electronic processor 102 may illuminate or flash (in a pattern) a particular number of LEDs of the LEDs 132 to indicate the present temperature setting.

FIGS. 4A-4D each illustrate an example of the user interface 108 according to some embodiments. FIGS. 4A-4D illustrate the user interface 108 integrated into the left grip heating module 104. However, it should be understood that the user interface 108 may be integrated into either heating module 104 and 106 and, in some embodiments, may be distributed between both heating modules 104 and 106. FIG. 4A illustrates the user interface 108 including a pushbutton as the user actuated device 130 and the plurality of LEDs 132 including three LEDs to indicate the present temperature state. FIG. 4B illustrates the user interface 108 including a pushbutton as the user actuated device 130 and the plurality of LEDs 132. The plurality of LEDs 132 in this configuration includes three LEDs to indicate the present temperature state and a fourth LED 132A to indicate when the handgrip heating system 100 is active. FIG. 4C illustrates the user interface 108 including a switch as the user actuated device 130 and the plurality of LEDs 132. In this configuration, the plurality of LEDs 132 also includes three LEDs to indicate the present temperature state and a fourth LED 132A integrated in the user actuated device 130 to indicate when the handgrip heating system 100 is active. FIG. 4D illustrates the user interface 108 including a bumper switch as the user actuated device 130 and the plurality of LEDs 132 including three LEDs to indicate the present temperature state. These embodiments of the user interface 108 are provided as examples and other configurations are possible.

Returning to FIG. 1, the electronic processor 102 includes a microprocessor, an application specific integrated circuit (ASIC), or other electronic device that executes instructions (software) to perform specific functionality, including the functionality described herein. The electronic processor 102 may retrieve executable instructions from the memory 118. The memory 118 includes a non-transitory computer-readable medium that may include one or more types of memory, such as read-only memory (ROM), random access memory (RAM), or a combination thereof.

As noted above, in some embodiments, the handgrip heating system 100 includes the transceiver 120. The transceiver 120 may be configured to communicate over one or more wired or wireless communication networks. For example, transceiver 120 may include a wired or wireless modem, a connector or port for receiving a connection to a wired network (for example, an Ethernet connector, a controller area network (CAN) connector), or a combination thereof. The electronic processor 102 may be configured to operate the transceiver 120, and the transceiver 120 may be configured to communicate with devices internal to the system 100, external to the system 100, or a combination thereof. For example, in some embodiments, the electronic processor 102 (via the transceiver 120) communicates with a communication system of the motorcycle 200, such as a CAN bus of the motorcycle 200. In particular, the electronic processor 102 may communicate a state of the grip heating modules 104 and 106 (an operative state, a present temperature setting, or the like) over the CAN bus, which may be consumed and used by other motorcycle components. Alternatively or in addition, the handgrip heating system 100 may communicate a state of the grip heating modules 104, 106 directly to another motorcycle component over a dedicated wired or wireless connection.

The H-bridge 112 positioned between the electronic processor 102 and the right grip heating module 106 is configured to alternate between two voltage polarities based a command from the electronic processor 102. The H-bridge 112 is provided as one example of a polarity switching circuit and other circuits with similar functionality as an H-bridge 112 may be used in place of the H-bridge 112 illustrated and described herein. The grip heating modules 104 and 106 each include a heating element 122 and 124, respectively. Each of the heating elements 122 and 124 are configured to heat an area of their respective handgrip 103 and 105. In some embodiments, the heating elements 122 and 124 are printed flexible heaters.

Each of the grip heating modules 104 and 106 also include a temperature sensor 126 and 128, respectively. Each of the temperature sensors 126 and 128 is configured to measure a temperature related to each of the heating elements 122 and 124, respectively. In some embodiments, one or both of the temperature sensors 126 and 128 are thermistors. The temperature sensors 126 and 128 may be configured to measure a temperature of the heating element 122 and 124, an area proximate the heating elements 122 and 124, or a combination thereof.

In some embodiments, at least one of the modules 104 and 106 includes a diode. For example, in the embodiment illustrated in FIG. 1, the right grip heating module 106 includes a diode 129. As also illustrated in FIG. 1, in some embodiments, a second diode 134 is also positioned between the H-bridge 112 and the module 106. As explained in more detail below in regard to FIGS. 3A and 3B, the diodes 129 and 134 may be used to direct current flow to and from the heating module 106 and its components.

In some embodiments, the system 100 further includes a grip sensor 136 and 138 in each of the grip heating modules 104 and 106 respectively. The grip sensors 136 and 138 are configured to detect when a user grips the respective handgrip 103 or 105. In some embodiments, the grip sensors 136 and 138 may be further configured to measure an amount of pressure applied to a particular area of the respective handgrip 103 and 105. The grip sensors 136 and 138 may be any kind of touch sensor, pressure sensor, or combination thereof. In some embodiments, the grip sensors 136 and 138 are object sensors, for example infrared sensors or cameras, configured to detect the presence of a user's hand to detect when the user is gripping a handgrip. In some embodiments, the electronic processor 102 is configured to operate either the respective heating element, temperature sensor, or both of each of the heating modules 104 and 106 based on whether the respective grip sensor 136 and 138 detects a grip. In other words, the electronic processor 102 may implement the heating feature of either handgrip 103 and 105 independently in response to detecting a user gripping the particular handgrip. Controlling heating based on detected grips improves power efficiency as power is not consumed to heat a handgrip unless a user is currently gripping the handgrip.

In some embodiments, the grip heating modules 104 and 106 are partially or entirely implemented on a printed flexible circuit board disposed around and/or within their respective handgrip 103 and 105. In such embodiments, the temperature sensors 126 and 128, heating elements 122 and 124, the grip sensors 136 and 138, or a combination thereof may be disposed on or integrated into the printed flexible circuit board. Either printed circuit board may also include one or more elements of the system 100, such as, for example, one or more H-bridges, diodes, or a combination thereof.

Figure 3A:
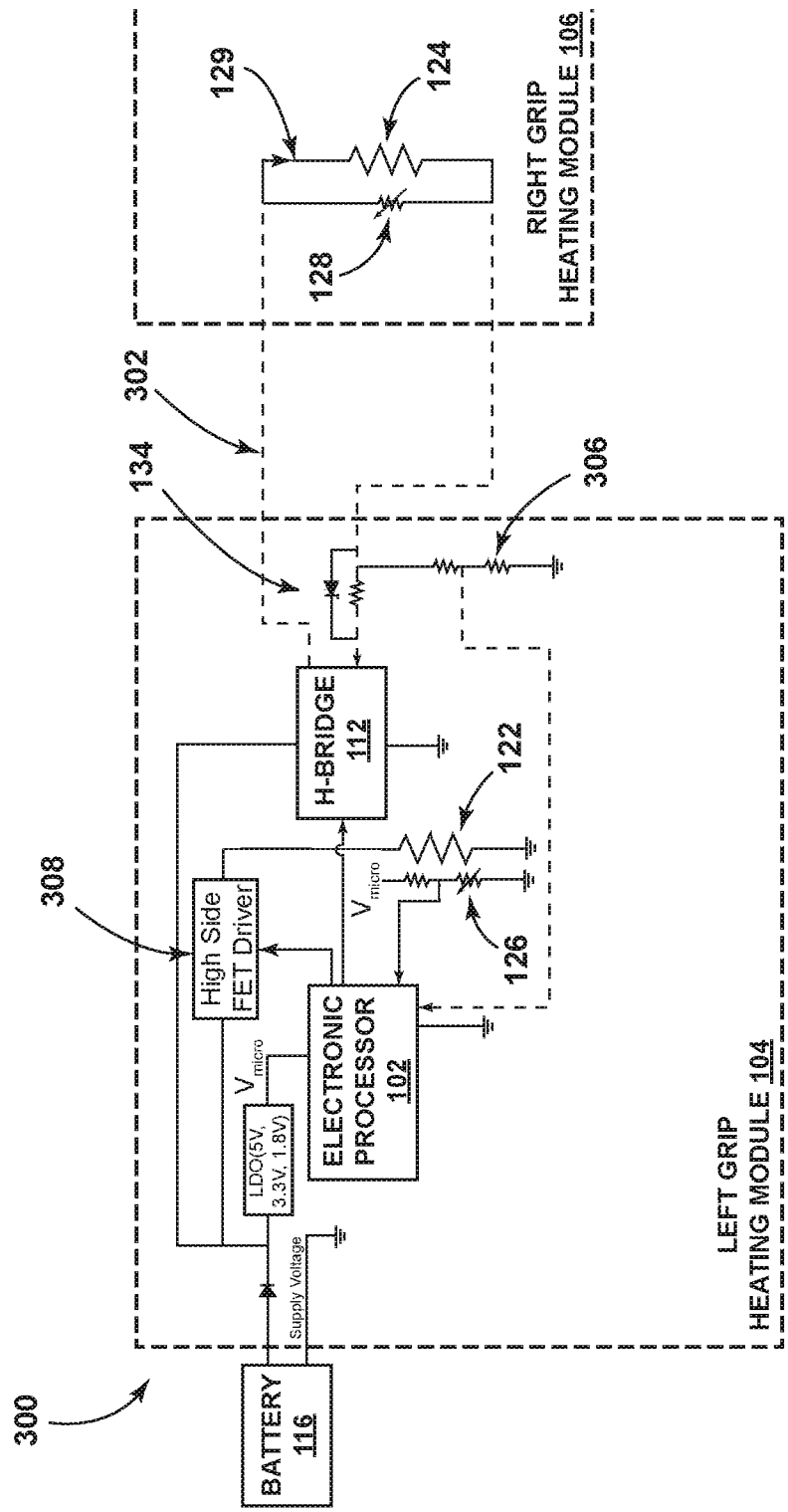
FIG. 3A illustrates a circuit schematic of the handgrip heating system of FIG. 1 according to some embodiments.
Figure 3B:
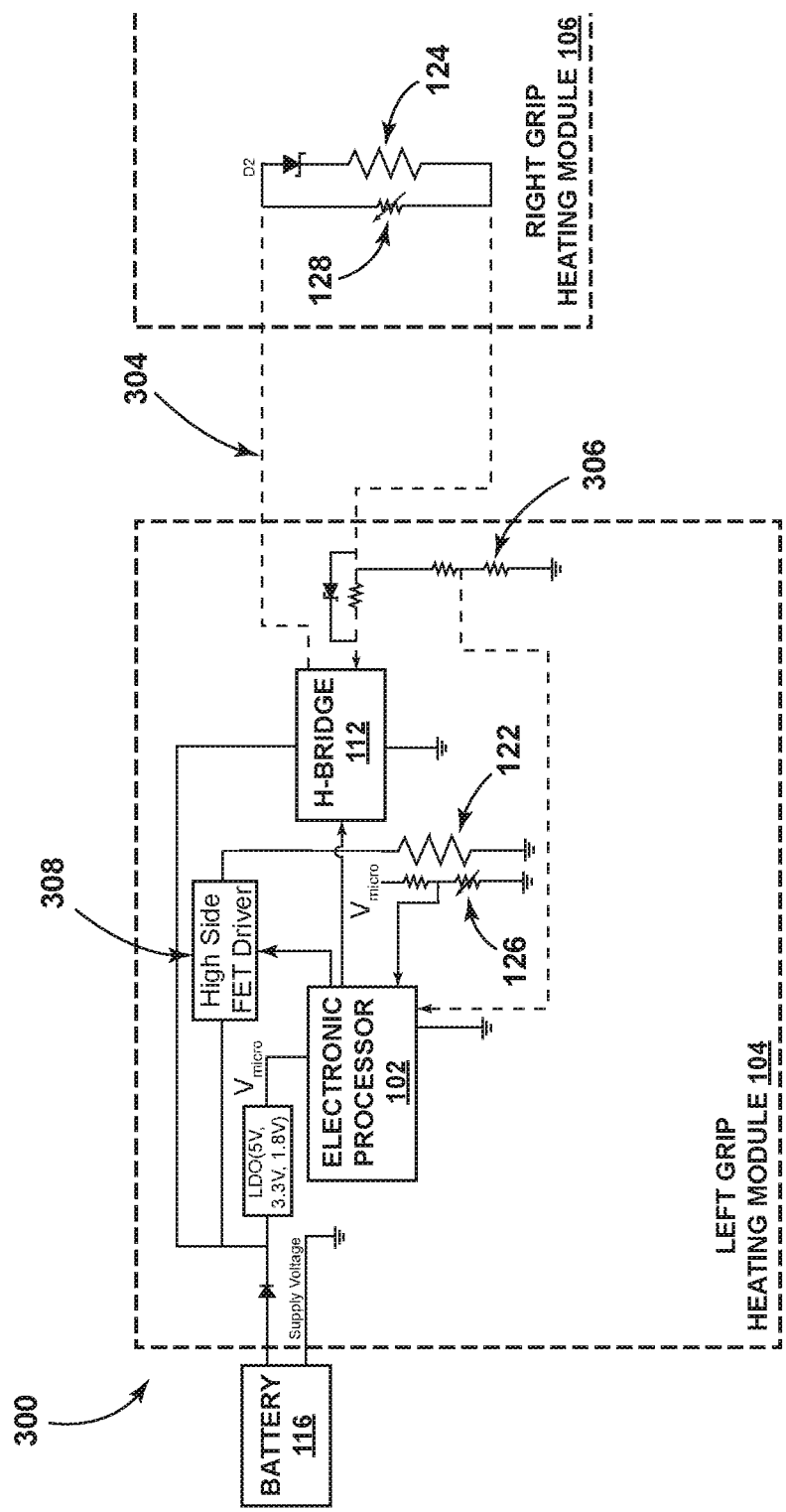
FIG. 3B illustrates a circuit schematic of the handgrip heating system of FIG. 1 according to some embodiments.

FIGS. 3A and 3B illustrate a circuit schematic 300 of a portion of the handgrip heating system 100 according to some embodiments. In the circuit schematic 300, the electronic processor 102 is illustrated as part of the left grip heating module 104. However, it should be understood that, in some embodiments, the electronic processor 102 may be integrated into either or both heating modules 104 and 106. In further embodiments, the electronic processor 102 may be positioned separate from the modules 104 and 106 (for example, as illustrated in FIG. 1). For example, in some embodiments, the electronic processor 102 is housed outside of or separate from the modules 104 and 106.

Returning to FIGS. 3A and 3B, in some embodiments, the right grip heating module 106 is coupled to the H-bridge 112 (and the left grip heating module 104) via two wires. The particular two-wire coupling of the right grip heating module 106 to the electronic processor 102 (through the H-bridge 112) advantageously reduces the amount of space and amount of wire necessary while maintaining a reliable, cost-effective power connection between such elements.

As described above, the H-bridge 112 switches between activation in a first polarity and activation in a second polarity. FIG. 3A illustrates the circuit schematic 300 with the H-bridge 112 activated in a second polarity (power flow in this configuration is indicated by the dashed path 302). In the second polarity, the right grip heating module 106 receives power from the battery 116 to activate the heating element 124. In some embodiments, the amount of power provided to the heating element 124 is based on the temperature setting set by the user of the handgrip heating system 100 via the user interface 108. For example, when the heating elements 122 and 124 are operated via a pulse-width modulation (PWM) signal, the duty cycle of the signal is adjusted based on the temperature setting. However, in other embodiments when thermostatic control is used, the amount of the power delivered to the heating element 124 may be constant.

After a predetermined time, the electronic processor 102 switches the H-bridge 112 to a first polarity. The predetermined time may be a set time duration (for example, in embodiments where the heating element 124 is thermostatically controlled) or an on or off cycle of a control signal (for example, in embodiments where the heating element 124 is controlled via a PWM signal). FIG. 3B illustrates the circuit schematic 300 with the H-bridge 112 activated in the first polarity (power flow in this configuration is indicated by the dashed path 304). When the H-bridge 112 is activated in the first polarity, the temperature sensor 128 (illustrated as a thermistor) receives power, allowing the temperature of the right grip heating module 106 to be received by the electronic processor 102 (via one of the two wires connecting the H-bridge 112 to the right grip heating module 106). In the illustrated embodiment, the sensed temperature is received by the electronic processor 102 through a temperature sensing circuit (a condition circuit), such as a resistive divider network 306. As explained in more detail below in regard to FIG. 5, the H-bridge 112 may be set back to the second polarity based on the temperature sensed by the temperature sensor 128. In particular, when the sensed temperature of the right handgrip 105 (from the temperature sensor 128) fails to exceed a temperature threshold (a maximum threshold) for the right grip heating module 106 (the right handgrip 105 is cool and requires additional heating), the H-bridge 112 may be set to the second polarity (to continue heating the right handgrip 105). As noted above, when PWM signals are used and the temperature signals fails to exceed the temperature threshold, the H-bridge 112 may be set to the second polarity for a predetermined amount of time that depends on a difference between the sensed temperature and the temperature threshold. Alternatively, when the sensed temperature of the right handgrip 105 (from the temperature sensor 128) exceeds the temperature threshold associated with the right handgrip 105, the H-bridge 112 may remain in the first polarity (monitoring temperature). Alternatively, in this situation, the H-bridge may be set to an "off" condition where neither the temperature sensor 128 nor the heating element 124 is connected to power. It should be understood that in some embodiments, the thresholds used by the electronic processor 102 may vary depending on the previous state. For example, when, during the last control cycle, the heating element 124 was on (receiving power), the electronic processor 102 will only turn off the heating element 124 off when the temperature threshold is exceeded and this threshold may be different from a temperature threshold used to determine when to turn the heating element 124 back on. Using different thresholds allows for hysteresis when using thermostatic (on/off) control.

A high side driver 308 is controlled by the electronic processor 102 to alternate power to the heating element 122 of the left grip heating module 104. Power is supplied to the heating element 122 through the high side driver 308 until a predetermined time is exceeded. As illustrated in FIG. 1, since the electronic processor 102 is included in the left grip heating module 104 in this embodiment, the temperature sensor 126 is directly connected to the electronic processor 102 (as compared to through the H-bridge 112).

Accordingly, as described above, the right grip heating module 106 receives power and ground from the left grip heating module 104 via the two-wire path, which may pass through a twist-grip sensor for the right grip (that has limited space for wiring). Polarity of the power and ground is switched by the electronic processor 102 and the H-bridge 112. In particular, in one polarity (see FIG. 3A, illustrating a second polarity), the diode 129 allows current to flow through the right grip heating element 124, and the diode 134 allows current flow around a resistor (for example, a 10 k resistor). In some embodiments, a blocking diode is provided to prevent minimal current flow through the temperature sensor 128 in this polarity. In the opposite polarity (see FIG. 3B, illustrating a first polarity), diodes 129 and 134 block current, which directs current flow through the temperature sensor 128 and associated resistive divider network 306. Thus, in this first polarity, the electronic processor 102 can sample the voltage through the divider network 306 to determine a right grip temperature. Accordingly, the electronic processor 102 can detect the temperature of both the left and right handgrips 103 and 105 without requiring extensive and complex wiring between the electronic processor 102 and both handgrips 103 and 105. It should be understood that, in some embodiments, the electronic processor 102 may also include a second polarity switching circuit, such as a second H-bridge configured similar to the H-bridge 112, to provide power to the temperature sensor 126 and the heating element 122 of the left grip heating module 104 as described above in regard to the temperature sensor 128 and heating element 124.

As noted above, in some embodiments, the electronic processor 102 may be included in one of the heating modules 104 or 106 (see FIGS. 3A and 3B). However, in other embodiments, the electronic processor 102 may be included in a module separate from the left grip heating module 104 and the right grip heating module 106 (see FIG. 1). In this configuration, the module including the electronic processor 102 may be positioned on the motorcycle 200 in various locations and orientations. However, in some embodiments, the module 104 or 106 including the electronic processor 102 is positioned (mounted) on one of the grips to limit wiring and wiring complexity between the electronic processor 102 and the modules 104 and 106.

Figure 6:
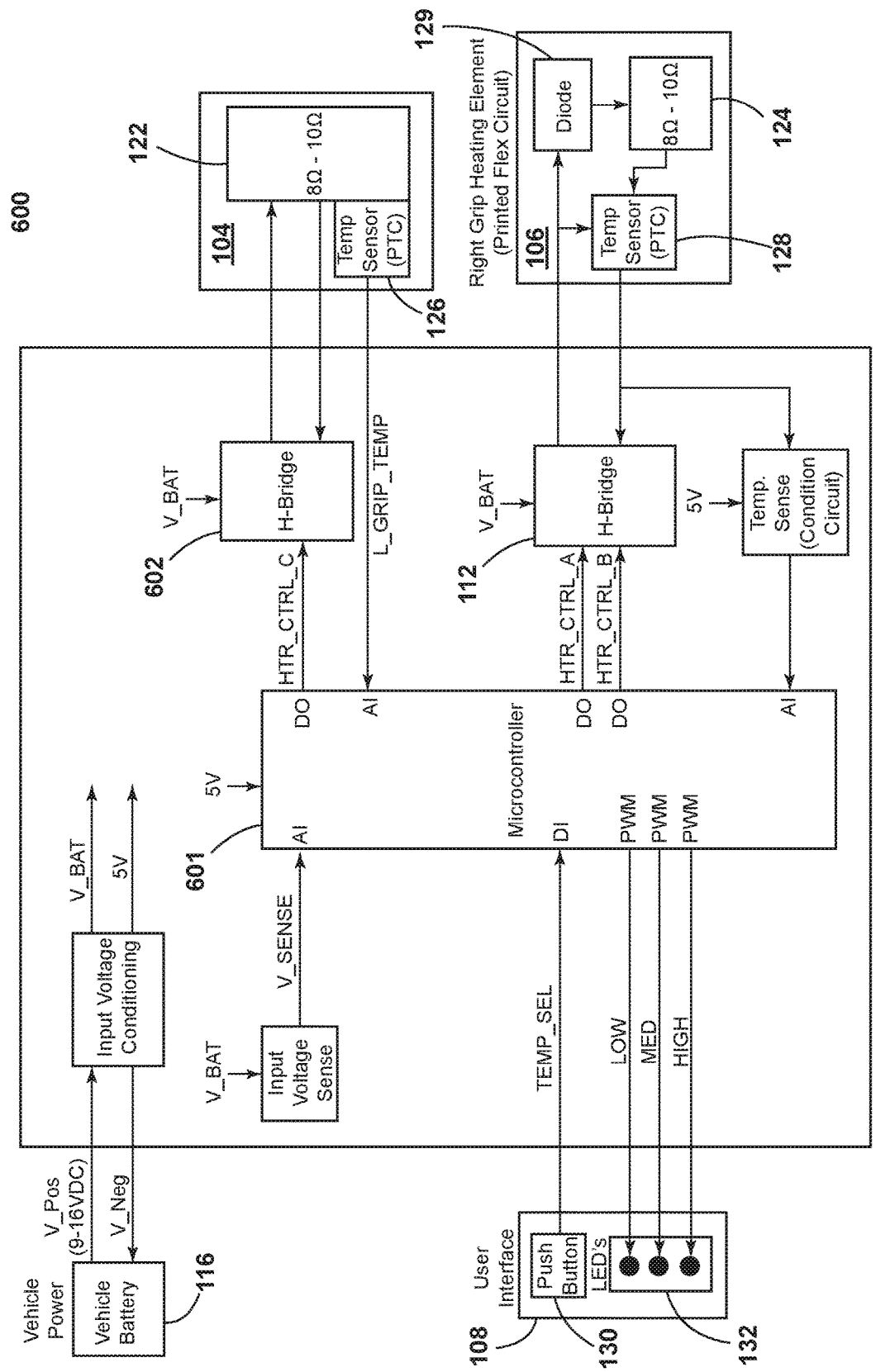
FIG. 6 illustrates a circuit schematic of the handgrip heating system of FIG. 1 according to some embodiments.

FIG. 6 illustrates a circuit system 600 of the handgrip heating system of FIG. 1 according to another embodiment. As illustrated in FIG. 6, the electronic processor 102 (microcontroller) is included in a module 601 separate from the left grip heating module 104 but provides power to and communication to and from the module 104 using an H-bridge 602 and a two-wire connection to the module 104. It should be noted that, in the illustrated embodiment, the H-bridge 602 is configured to function as a high side driver, similar to the driver 308 of FIGS. 3A and 3B. In the embodiment illustrated in FIG. 6, the module 601 including the electronic processor 102 is positioned on the left handgrip 103. Therefore, the electronic processor 102 may be connected to the temperature sensor 126 of the module 104 over a dedicated wired connection. However, because the right handgrip 105 is not proximate to the electronic processor 102, the electronic processor 102 is connected to the right grip heating module 106 via the H-bridge 112 both to provide power and communication to and from the module 106 (for example, to receive a temperature reading from the temperature sensor 128 included in the module 104).

It should be understood that, in some embodiments, the electronic processor 102 is positioned on the right handgrip 105 or within the right grip heating module 106. In such embodiments, the electronic processor 102 may use a dedicated connection with the temperature sensor 128 of the module 106 to receive temperature signals and may use an H-bridge to receive temperature signals from the left grip heating module 104. Accordingly, in such embodiments, the components and configuration of the modules 104 and 106 may be flipped from the components and configuration illustrated in FIG. 6. Alternatively, as mentioned above, in some embodiments, both the grip heating modules 104 and 106 include an H-bridge configured to provide power to the respective heating element 122 and 124 and temperature sensor 126 and 128 similar to the H-bridge 112 and, thus, provide a two-wire connection to both handgrips.

Figure 5:
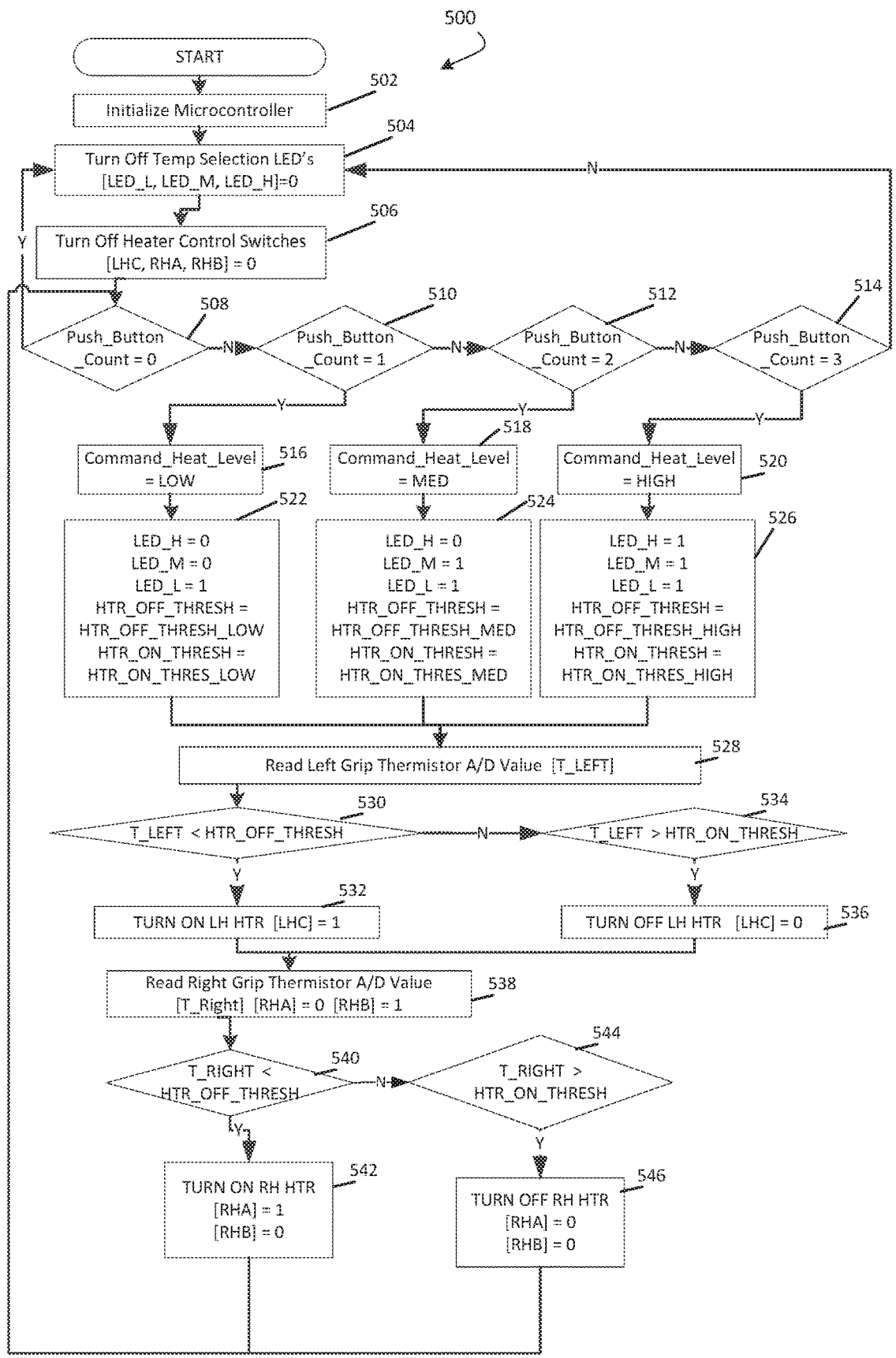
FIG. 5 is a flowchart illustrating a method of operating the handgrip heating system of FIG. 1 according to some embodiments.

FIG. 5 is a flowchart further illustrating a control process or method 500 implemented by the electronic processor 102 to control the system 600 based on user input received through the user interface 108 in more detail. Although the method 500 is described in terms of the system 600, it should be understood that a similar method may be applied to the system 100.

At block 502, the electronic processor 102 is initialized and, at blocks 504 and 506 respectively, the electronic processor 102 deactivates the LEDs and heating elements 122 and 124. In some embodiments, the H-bridge 112 is also activated in the first polarity. At blocks 508, 510, 512, and 514, the electronic processor 102 determines user input received through the user interface 108 for setting a desired temperature of one or both of the grips. For example, in some embodiments, the electronic processor 102 determines the number of times the user actuated device 130 has been actuated. Based on the number of times the user actuated device 130 is actuated, the electronic processor 102 determines a temperature level or setting for one or both of the grip heating modules 104 and 106. For example, in the illustrated embodiments, a single actuation corresponds to a low heat setting (block 510), two actuations correspond to a medium heat setting (block 512), and three actuations correspond to a high heat setting (block 514). When the user actuated device 130 has not been actuated (block 508), the electronic processor 102 returns to block 504 (to wait for subsequent user input). In the illustrated embodiment, when the user actuated device 130 is actuated again after being actuated three times, the actuation count returns to zero.

Based on the user input, the electronic processor 102 activates one or more of the plurality of LEDs 132 to indicate the particular heat setting (in the illustrated embodiment, a low heat setting, a medium heat setting, or a high heat setting) and sets a predetermined temperature threshold for the heating elements 122 and 124 based on the particular heat setting (blocks 522, 524, and 526). In the illustrated embodiment, the predetermined temperature threshold includes a maximum threshold (when heating is turned off) and a minimum threshold (when heating is turned on). The maximum threshold corresponds to a maximum temperature threshold that the heated area of the grip heating module 104 and 106 may achieve before the corresponding heating element 122 and 124 is deactivated. The minimum threshold corresponds to a minimum temperature threshold that the heated area of the grip heating module 104 and 106 may achieve before the corresponding heating element 122 and 124 is reactivated. In some embodiments, the maximum threshold, the minimum threshold, or both are dynamically adjusted based on, for example, a user input, a previous heat setting, a last sensed temperature, or the like.

At block 528, the electronic processor 102 receives the temperature signal from the temperature sensor 126, and, at block 530, the electronic processor 102 determines whether the temperature signal from the temperature sensor 126 falls below than the minimum threshold. When the temperature signal from the temperature sensor 126 falls below the minimum threshold, the electronic processor 102 activates the heating element 122 (block 532). When the temperature signal from the temperature sensor 126 exceeds the minimum threshold, the electronic processor 102 determines whether the temperature sensed by the temperature sensor 126 exceeds the maximum threshold. When the temperature signal exceeds the maximum threshold, the electronic processor 102 deactivates (or discontinues power) to the heating element 122 (block 536).

At block 538, (since the H-bridge 112 is in the first polarity) the electronic processor 102 receives the temperature signal from the temperature sensor 128 and, at block 540, the electronic processor 102 determines whether the temperature signal from the temperature sensor 128 falls below than the minimum threshold. When the temperature signal from the temperature sensor 128 falls below the minimum threshold, the electronic processor 102 activates the heating element 124 (block 542). In particular, the electronic processor 102 sets the H-bridge 112 to the second polarity as described above. When the temperature signal from the temperature sensor 128 exceeds the minimum threshold, the electronic processor 102 determines whether the temperature sensed by the temperature sensor 128 exceeds the maximum threshold. When the temperature signal exceeds the maximum threshold, the electronic processor 102 deactivates (or discontinues power) to the heating element 124 (block 536). In the illustrated embodiment, the electronic processor 102 deactivates the heating element 124 by setting the H-bridge 112 into an open state, discontinuing power through the H-bridge 112. The electronic processor 102 then returns to block 508 to determine whether the user actuated device 130 was actuated.

Figure 7:
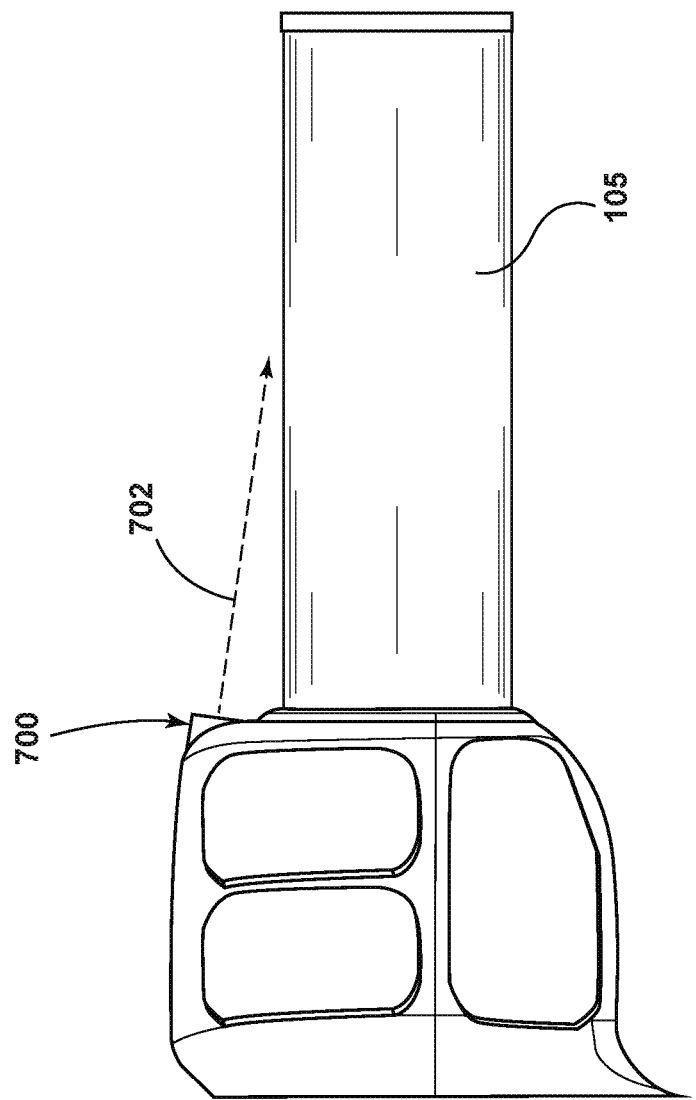
FIG. 7 illustrates a grip sensing system including a laser distance sensor according to some embodiments.

As mentioned above, in some embodiments, the system 100 includes grip sensors 136 and 138. In such embodiments, the electronic processor 102 may further be configured to implement the heating function in either grip heating module 104 and 106 based on whether the respective grip sensor 136 and 138 indicates the presence of a user's grip. In other words, the electronic processor 102 may be configured to discontinue power to either heating element 122 and 124 (as well as to a respective H-bridge when power is provided to the heating element 122 or 124 through an H-bridge, such as H-bridge 112) in response to determining, via the respective grip sensor 136 and 138, that there is no grip on the respective handgrip 103 and 105. In some embodiments, power to one or both of the grip sensors 136 and 138 may be incorporated into the function of the H-bridge providing power to the module 104 and/or 106. For example, in some embodiments, one or more both of the grip sensors 136 and 138 receive power while the respective heating element 122 and 124 is receiving power (the second polarity) or the respective temperature sensor 126 and 128 is receiving power (the first polarity). As noted above, the grip sensors 136 and 138 may include touch or pressure sensors. Alternatively or in addition, the grip sensors 136 and 138 may include object sensors, for example infrared sensors or cameras, configured to detect the presence of a user's hand to detect when the user is gripping a handgrip. For example, FIG. 7 illustrates a use of a laser distance sensor 700 configured to detect a distance (illustrated by the dashed line 702) to a handgrip (such as the right handgrip 105). When a user grip's the handgrip 105, the user's hand (fingers) impact the distance measured by the laser distance sensor 700 and, in particular, causes the laser distance sensor 700 to measure a (shorter) distance between the laser distance sensor 700 and the user's hand. Accordingly, as this sensed distance changes (when the user's hand is present), the electronic processor 102 can determine whether the user is gripping the handgrip 105. In some embodiments, the left handgrip 103 includes a similar laser distance sensor 700 as illustrated in FIG. 7 for the right handgrip 105.

In some embodiments, the left handgrip 103, the right handgrip 105, or both provide additional functionality in addition to heat. For example, in some embodiments, each handgrip 103 and 105 provides grip sensing (as described above), grip heating, haptic feedback, or a combination thereof. In particular, in some embodiments, one or both of the handgrips 103 and 105 may provide haptic feedback to a user's hands to enhance rider assistance or motorcycle infotainment functions. For example, haptic prompts could be used by the navigation system to indicate upcoming right or left turns, or by the vehicle to vehicle communication system to inform the user of a vehicle speeding through a blind intersection ahead.

Also, in some embodiments, a detected position of a user's hand or grip may be used to enhance these functions. For example, grip sensing as described above may be used to detect the user's hand position relative to the handgrips 103 and 105, such as whether the user's hands are off one or both of handgrips 103 and 105, touching one or both of the handgrips 103 and 105 but not holding them (based on detected pressures), holding one or both of the handgrips 103 and 105 lightly or tightly, whether the user is wearing gloves (based on information from touch or pressure sensors or colors or patterns detected by optical grip sensors), or the like. As described below, the electronic processor 102 may use this detected information regarding the user's grip to modify operation of the motorcycle or particular functions of the motorcycle.

Figure 8:
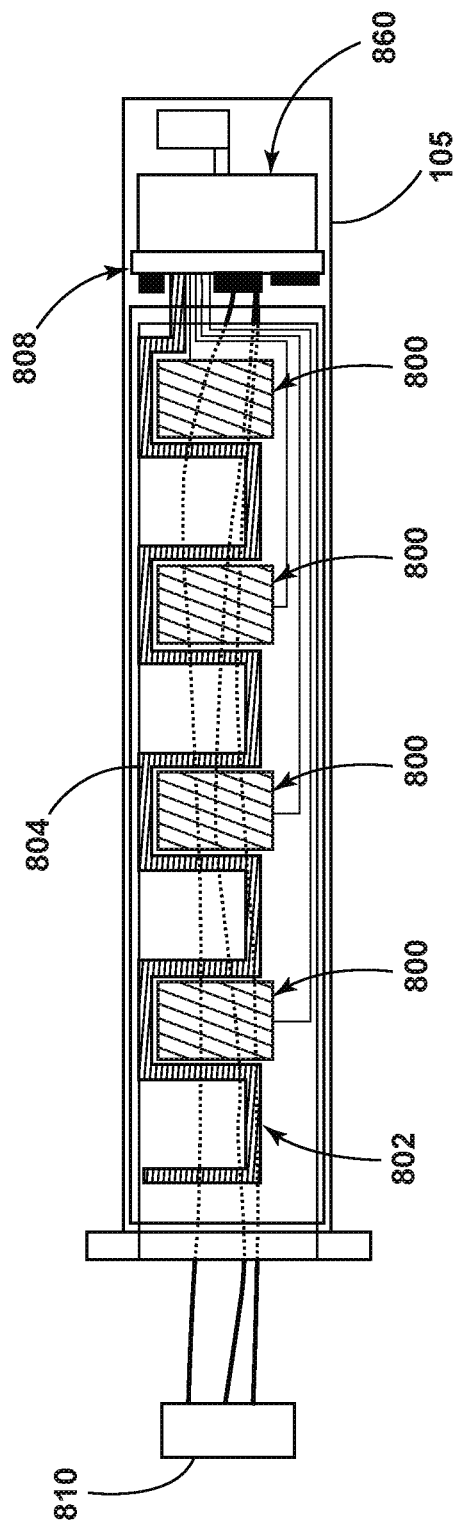
FIG. 8 illustrates a combination grip for performing both heating and grip sensing according to some embodiments.

Various methods for detecting a user's grip have been described above. However, one specific method that may be used to detect a user's hand position is through a combination grip that provides both heating and grip sensing. FIG. 8 illustrates one configuration of such a combination grip. It should be understood that in the following description, some or all of the components of the combination grip may be included within or considered to be part of either or both the grip heating modules 104 and 106. As illustrated in FIG. 8, the combination grip includes one or more capacitive sensing electrodes 800 (copper pads) positioned on a flexible printed circuit board 802 that is incorporated into a cylindrical handgrip, such as the right handgrip 105. Using this configuration, the handgrip 105 is heated by passing current (for example, PWM current) through a resistive trace 804 also included on the flexible printed circuit board 802. In some embodiments, incorporating both the capacitive sensing and heating functions onto a single flexible printed circuit board reduces overall part count, complexity, and cost as compared to using two printed circuit boards or two separate circuits. As also illustrated in FIG. 8, in this configuration, a haptic vibration motor 806, such as a small eccentric mass motor, is mounted at the end of the handgrip 105, which allows the handgrip 105 to also provide haptic feedback. In some embodiments, a gel-like substance can also be included in the combination grip to improve the ability of the capacitive sensing electrodes to detect a grip presence or pressure, improve the provision of haptic feedback to a user, or a combination thereof. Other types of intermediary or transform components (whether mechanically-implemented or electrically-implemented) may similarly be used to detect a grip and provide feedback along the handgrip 105.

In some embodiments, the combination grip includes wiring (for example, discrete wires for each heating, grip sensing, and haptic feedback) connecting to an external controller, such as the electronic processor 102 described above. For example, in some embodiments, the electronic processor 102 described above may control heating of the handgrip 105 via the resistive trace 804 by controlling power to the resistive trace 804 as described above. In some embodiments, the electronic processor 102 may also control the haptic vibration motor 806. The electronic processor 102 may also receive sensed information regarding the user's grip and control the heating, haptic feedback, motorcycle operation, or the like based on the sensed information. As compared to using the electronic processor 102 (or another external controller), in other embodiments, a microcontroller is incorporated into the combination grip assembly. For example, as illustrated in FIG. 8, in some embodiments, the combination grip includes an electronic processor 808 configured to control heating via the resistive trace 804, to control the haptic vibration motor 806, or both. In this embodiment, the electronic processor 808 may include a rigid printed circuit board with a microcontroller, such as a local interconnect network (LIN) microcontroller, a controller area network (CAN) microcontroller, or the like. As illustrated in FIG. 8, in some embodiments, the electronic processor 808 directly interfaces with the haptic vibration motor 806 and is electrically coupled to the flexible printed circuit board 802 (and the resistive trace 804) via wiring. As illustrated in FIG. 8, a connector 810 can connect the flexible printed circuit board 802, the electronic processor 808, the haptic vibration motor 806, or a combination thereof to an electrical system of the motorcycle, which may provide power, ground, and, optionally, communication, such as LIN communication. It should be understood that in some embodiments, the left handgrip 103 includes a similar combination grip as illustrated in FIG. 8 for the right handgrip 105. However, in some embodiments, different sensing, heating, or feedback systems may be used between the left and right handgrips 103 and 105.

It should be understood that in some embodiments, functions described herein as being performed by a grip assembly described herein, such as the combination grip, may be incorporated into one or more hand control switchpack rather than a handgrip itself. A hand control switchpack is generally removably mounted on a handgrip and often includes one or more hand controls for controlling operation of the motorcycle (for example, controlling lights, infotainment features, or the like). For example, when grip sensing is performed using an optical sensor, such as the laser distance sensor 700 illustrated in FIG. 7, the hand control switchpack may incorporate the laser distance sensor 700 to detect when the user's hand (fingers) are positioned between the sensor and a handgrip. Similarly, in some embodiments, a hand control switchpack may contain the haptic vibration motor 806 rather than mounting the haptic vibration motor 806 to the end of the handlebar.

Figure 9:
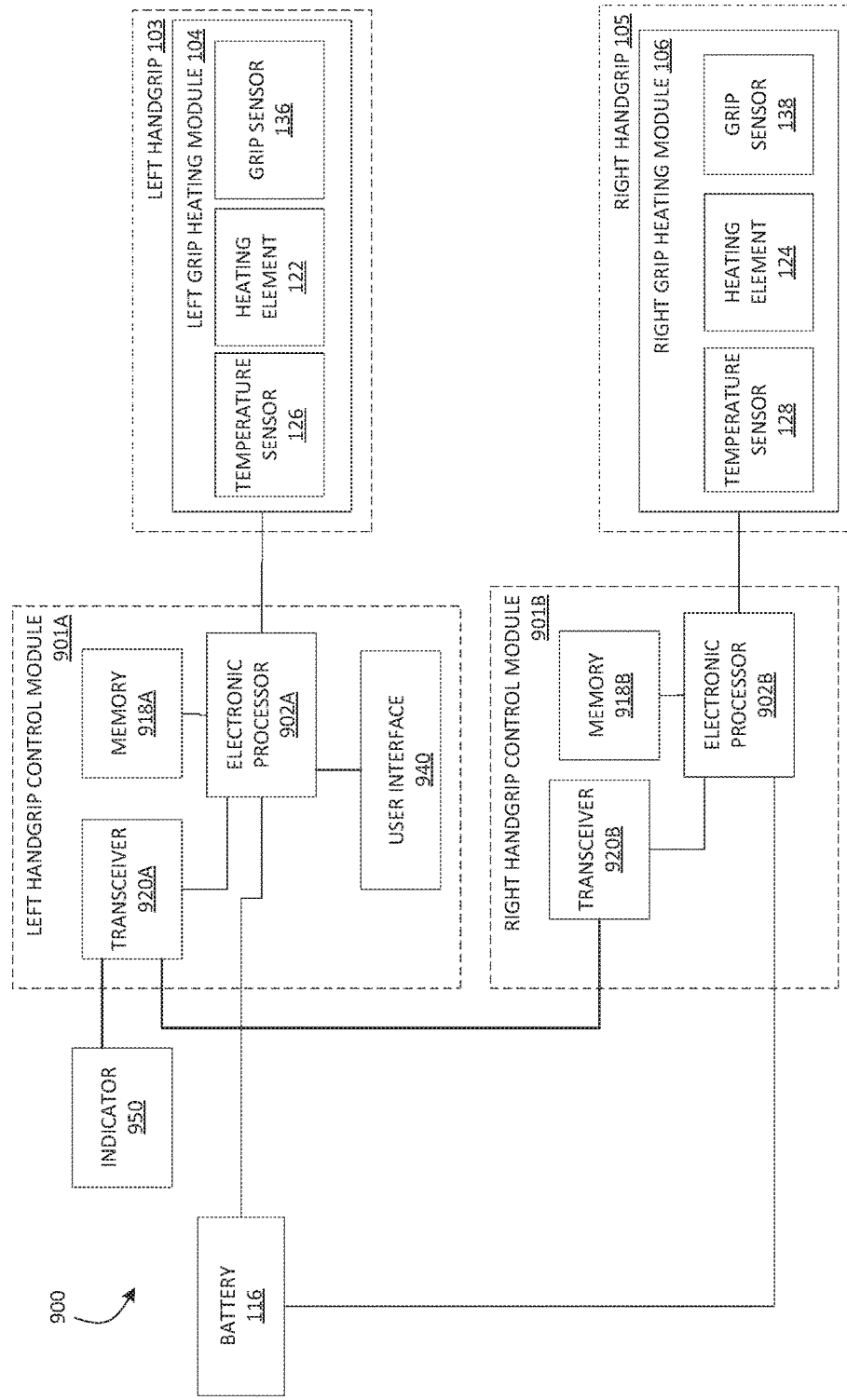
FIG. 9 schematically illustrates the handgrip heating system of FIG. 1 according to some embodiments.

In some embodiments, the handgrip heating system 100 includes multiple electronic processors as an alternative to the single electronic processor 102. For example, as mentioned above, each of the left and right handgrips 103 and 105 may include an electronic processor 808 when configured as a combination grip. Similarly, in some embodiments, each of the left and right handgrips 103 and 105 may include an individual electronic processor for controlling heating, feedback, or a combination thereof. For example, FIG. 9 schematically illustrates a handgrip heating system 900 including a first (left) handgrip control module 901A and a second (right) control module 901B, each of which are configured to independently control the left and right grip heating modules 104 and 106, respectively. The left handgrip control module 901A includes an electronic processor 902A and the right handgrip module 901B includes an electronic processor 902B. In some embodiments, as illustrated in FIG. 9, either or both control modules 901A and 901B may further include one or more of a memory 918A and 918B and a transceiver 920A and 920B. The components of the heating system 900 and functionality thereof may be similar to those described above in regard to the system 100 of FIG. 1 and therefore, for sake of brevity, are not discussed in detail here. For example, memory 918A and 918B may be configured similar to the memory 118 and transceivers 920A and 920B may be configured similar to the transceiver 120.

In the illustrated handgrip heating system 900, the control modules 901A and 901B (in particular, processors 902A and 902B) control and monitor their respective heating modules 104 and 106, effectively replacing the H-bridge 112 (and diode 134) illustrated in the system 100 of FIG. 1. Here, the processors 902A and 902B are configured to measure the temperature of their respective handgrip 103 and 105 via the respective temperature sensor 126 and 128. Based on the received temperature compared to the temperature setting/state (described above), each processor 902A and 902B provides power (or reduces or discontinues power) to the respective heating element 122 and 124. In other words, the modules 901A and 901B control and monitor the heating operation of their respective handgrip 103 and 105 independent from each other, reducing the risk of a significant temperature difference between the two handgrips. In some embodiments, either or both of the first handgrip and the second handgrip include a grip sensor (for example, grip sensors 136 and 138) and wherein the power supplied to the respective handgrip 103 and 105 is further based on an input from the respective grip sensor 136 and 138. In alternative embodiments, either or both processors 902A and 902B are configured to determine whether a user is gripping the respective handgrip 103 and 105 based on a change in rate of heating based on the information received from the respective temperature sensor 126 and 128 (for example, without the need for a separate grip sensor 138).

The control modules 901A and 901B and/or their components may be coupled to or integrated into the handlebar 202 and other components of the motorcycle 200 similar to the embodiments described above in regard to FIG. 1. For example, in some embodiments, one or both of the control modules 901A and 901B are included in hand control switchpacks coupled to the handlebar 202. The control modules 901A and 901B may be housed together in a single device or in separate devices. Also, in some embodiments, the control modules 901A and/or 901B and any number of their components thereof may be integrated into either or both handgrips 103 and 105 similar to the embodiments described above in regard to FIG. 1. As described above with respect to the system 100, each control module 901A and 901B may include short circuit protection and may be configured to shut down operation of the respective heating module in response to a current or voltage exceeding a predetermined amount or level. Each control module 901A and 901B may also be configured to turn off or otherwise inhibit heated grip functionality in their respective grips based on commands received from other components associated with the motorcycle 200, such CAN messages relating to load shedding or direct commands to turn off heating.

As illustrated in FIG. 9, one or both of the control modules 901A and 901B may communicate with a user interface 940, such as over a direct connection or a communication network of the motorcycle 200, such as a CAN bus. In some embodiments, the user interface 940 includes a momentary switch that allows a user to toggle through a set of predefined temperature levels (for example, "OFF," "HIGH," "MEDIUM," AND "LOW"). However, it should be understood that other types of user interfaces may be used. Furthermore, the user interface 940 may be incorporated in or mounted on various component of the motorcycle 200.

In some embodiments, only one of the control modules 901A and 901B communicates with the user interface 940 and may operate as a "master" for the system 900 by communicating a temperature level (set via the user interface 940) to other components, including the other control module. For example, as illustrated in FIG. 9, in some embodiments, the user interface 940 is included in or mounted on the left handgrip control module 901A and the electronic processor 902A included in the left handgrip control module 901A communicates the power state to the right handgrip control module 901B via the transceiver 920A, which may connect the modules 901A and 901B via a CAN bus. As illustrated in FIG. 9, the left handgrip control module 901A may also communicate with an indicator 950, such as an instrument panel displaying a graphical user interface, one or more LEDS, or the like, included in the motorcycle 200 to inform a user when the handgrips 103 and 105 are being heated and, optionally, the current temperature level of the handgrips. In some embodiments, the indicator 950 may also output information to inform a user of faults, such as faults detected by the left handgrip control module 901A as described below.

In some embodiments, the left handgrip control module 901A communicates with the indicator 950 through one or more intermediary devices. For example, in some embodiments, the left handgrip control module 901A communicates with a body control module (BCM) included in the motorcycle 200 (via the transceiver 920A), which relays information to the indicator 950. In particular, in some embodiments, BCM allows for communication between components connected to different communication networks within the motorcycle 200.

In some embodiments, one or both of the control modules 901A and 901B may communicate with the indicator 950 to receive a displayed or output power or temperature level. For example, as illustrated in FIG. 9, the left handgrip control module 901A may receive the temperature level currently being output (displayed) by the indicator 950 and compare the current output to the current temperature level to check for faults.

It should be understood that, in some embodiments, separate user interfaces 940 and separate indicators 950 may be provided for each handgrip 103 and 105. For example, separate user interfaces 940 may be provided to allow a user to set a different temperature level for each handgrip 103 and 105. Similarly, separate indicators 950 may be used to inform a user of the temperature level set for each handgrip 103 and 105, which may vary using the separate user interfaces 940. In this embodiments, the control modules 901A and 901B may communicate with their respective user interfaces 940 and indicators 950 or one of the control modules may continue to operate as the master for both of the user interfaces 940 and both of the indicators 950 as described above.

Accordingly, as compared to the embodiment of FIG. 1 wherein a single pair of wires (total of two wires) are used to provide power to the heating elements and temperature sensors to the one of the grip heating modules (for example, the right grip heating module 106) and the electronics are contained in the other grip heating module, the embodiment illustrated in FIG. 9 uses two pairs of wires (total of four wires) for each heated grip. As illustrated in FIG. 9, in some embodiments, the handgrips 103 and 105 themselves contain only a temperature sensor 126 and 128 (for example, a thermistor) and a heating element 122 and 124 wherein the electronic circuitry is contained in each hand control module. In particular, the left handgrip control module 901A contains the circuitry for driving and sensing the left heated grip and the right handgrip control module 901B contains the circuitry for driving and sending the right heated grip.

Closed-loop and independent temperature control allows for precise temperature measurement and control of the right and left handgrips individually. Independent heating control of each handgrip may be advantageous in particular in situations where each handgrip operates (heats or cools) at a rate different from another or is operating under different conditions. For example, when a user grips one handgrip during operation and not the second handgrip, the air velocity over and air temperature experienced by the exposed handgrip will reduce the rate of heating of the exposed handle. The control module 901A or 901B of the exposed handgrip may accordingly adjust the temperature to compensate for the reduced rate. Accordingly, the independent heating operation of the handgrips 103 and 105 allows the control circuits to maintain a consistent and accurate temperature of each handgrip. In addition, as noted above, the independent operation of the handgrips 103 and 105 allows a user to command the output (temperature level) of each handgrip independently, such as to heat the handgrips 103 and 105 to different temperatures if desired. Furthermore, integrating the heated grips driver and sense circuitry into the hand controls subsidizes the cost of the heated grips by eliminating an external control module. This configuration also provides advantages relating to the serviceability of parts. For example, with this configuration, each grip can be replaced independently and the same part can be used for each grip. Similarly, two separate control circuits and electronic processors eliminate single points of failure. Therefore, failure of one of the grips in many situations does not impact the operation of the other grip. The separate circuits and processors also allow each heated handgrip to be independently brought to a safe state, such as by turning of an individual heated handgrip, detecting faults of an individual handgrip, and the like. This independent temperature control embodiment also eliminates the need for an H-bridge (and associated diode) or similar components as included in system 100, which reduces complexity and cost of the system 900.

As noted above, detected grip information may be used in various ways to control heating, haptic feedback, and even operation of the motorcycle. For example, actions taken by a rider assistance function may be limited when the user is not gripping one or both of the handgrips 103 and 105 or is gripping a handgrip lightly. In particular, a motorcycle equipped with an adaptive cruise control or automated emergency braking system may apply greater or lower levels of acceleration and deceleration based on the sensed user hand position. For example, when user is holding the handgrips tightly, the system may allow quicker deceleration than when the user only has a hand on one of the two handgrips. Similarly, haptic feedback provided through the handgrips 103 and 105 may be modified based on whether the user is griping the handgrips (to preserve power in activating haptic feedback), has a light or tight grip on the handgrips and 103 and 105 (to ensure the user feels the haptic feedback), or whether the user is wearing gloves (again to ensure the user feels the haptic feedback). For example, if the user is wearing gloves (or thick gloves), gloves, the intensity of the haptic feedback in a handgrip grip or the heated grip temperature may be increased to compensate for the glove.

In some embodiments, the amount of time a user has gripped a handgrip 103 or 105 (with any grip or with a grip of a particular intensity) is also tracked and used to control operation of the vehicle. For example, in some embodiments, an amount of time since a user's grip has changed may be used to determine a vigilance or alert state of the user, which could be used to provide alerts to a user or automatically modify vehicle operation.

Thus, embodiments described herein provide, among other things, a heated handgrip system for a handlebar, such as a motorcycle. Some proposed system described herein allow for independent temperature control of both the left side and the right side of heated grips without requiring an additional sensor wire, such as from the right side grip to the left side grip. Rather, some embodiments of the proposed system uses two wires and a polarity switching circuit, such as an H-bridge, to switch the right side grip between heat and temperature sense. Heating provided through the handgrips may be controlled based on a sensed user grip, which may also be used to control haptic feedback provided through the grips, motorcycle operation, or a combination thereof. As also described herein, in some embodiments, heating and grip sensing may be provided through a multi-function printed circuit board, which reduces cost and complexity. As further described herein, in some embodiments, separate control modules may be used for each handgrip that independent controls (through a closed loop) the temperature of each grip. It should be understood that the various functions described herein as being performed via a handgrip can be applied in various configurations. For example, in some embodiments, a handgrip may only provide heating functionality. Similarly, in some embodiments, a handgrip may only provide grip sensing or only provide haptic feedback. Accordingly, it should be understood that the specific combination of functionality described herein are provided merely as examples and should not be construed as limiting.

What is claimed is:

1. A heated handgrip system including:
   a first handgrip including a first heating element and a first temperature sensor configured to produce a temperature signal indicative of a temperature related to the first heating element;
   a second handgrip including a second heating element and a second temperature sensor configured to produce a temperature signal indicative of a temperature related to the second heating element;
   a first electronic processor communicatively coupled to the first handgrip, the first electronic processor configured to
      receive a first temperature signal from the first temperature sensor,
      compare the first temperature signal to a first predetermined temperature threshold, and
      adjust power supplied to the first heating element via the first electronic processor based on the comparison of the first temperature signal to the first predetermined threshold; and
   a second electronic processor communicatively coupled to the second handgrip, the second electronic processor configured to
      receive a second temperature signal from the second temperature sensor,
      compare the second temperature signal to a second predetermined temperature threshold, and
      adjust power supplied to the second heating element via the second electronic processor based on the comparison of the second temperature signal and the second predetermined threshold.

2. The system of claim 1, wherein the first electronic processor and the second electronic processor operate the respective first heating element and second heating element independent of each other.

3. The system of claim 1, wherein the first predetermined threshold and the second predetermined threshold are the same.

4. The system of claim 1, wherein either or both of the first electronic processor and the second electronic processor is housed outside of the first handgrip.

5. The system of claim 1, wherein either or both of the first electronic processor and the second electronic processor is housed outside of the second handgrip.

6. The system of claim 1, wherein either or both of the first electronic processor and the second electronic processor is housed in the first handgrip.

7. The system of claim 1, wherein either or both of the first electronic processor and the second electronic processor is housed in the second handgrip.

8. The system of claim 1, wherein either or both of the first handgrip and the second handgrip include a grip sensor and wherein the power supplied to the respective handgrip is further based on an input from the respective grip sensor.

9. The system of claim 1, wherein either or both of the first electronic processor and the second electronic processor is configured to receive a set temperature level received through a user interface, wherein the set temperature level defines at least one of the first predetermined threshold and the second predetermined threshold.

10. The system of claim 9, wherein either the first electronic processor or the second electronic processor are configured to communicate the set temperature level to the other electronic processor.

11. The system of claim 9, wherein either or both of the first electronic processor and the second electronic processor is configured to communicate the set temperature to at least one indicator.

12. The system of claim 9, wherein either or both of the first electronic processor and the second electronic processor is configured to receive a state of the at least one indicator and compare the state of the at least one indicator to the set temperature level.

13. The system of claim 12, where either or both of the first electronic processor and the second electronic processor is configured to set a fault status in response to the state of the at least one indicator not matching the set temperature level.

14. A method of heating a first handgrip and a second handgrip included in a vehicle, the method comprising
   receiving, via a first electronic processor associated with the first handgrip, a first temperature signal from a first temperature sensor associated with the first handgrip;
   comparing, via the first electronic processor associated with the first handgrip, the first temperature signal to a first predetermined temperature threshold;
   adjusting, via the first electronic processor, power provided to a first heating element associated with the first handgrip based on the comparison of the first temperature signal and the first predetermined temperature threshold;
   receiving, via a second electronic processor associated with the second handgrip, a second temperature signal from a second temperature sensor associated with the second handgrip;
   comparing, via the second electronic processor associated with the second handgrip, the second temperature signal to a second predetermined temperature threshold; and
   adjusting, via the second electronic processor, power provided to a second heating element associated with the second handgrip based on the comparison of the second temperature signal and the second predetermined temperature threshold.

15. The method of claim 14, wherein adjusting the power provided to the first heating element associated with the first handgrip includes adjusting the power provided to the first heating element based on the comparison of the first temperature signal and the first predetermined temperature threshold independent of the comparison of the second temperature signal and the second predetermined threshold.

16. The method of claim 14, wherein adjusting the power provided to the second heating element associated with the second handgrip includes adjusting the power provided to the second heating element based on the comparison of the second temperature signal and the second predetermined temperature threshold independent of the comparison of the first temperature signal and the first predetermined threshold.

17. The method of claim 14, further comprising receiving, via the first electronic processor, a set temperature level from a user interface, wherein the set temperature level defines at least one of the first predetermined threshold and the second predetermined threshold.

18. The method of claim 17, further comprising communicating, via the first electronic processor, the set temperature level to the second electronic processor.

19. The method of claim 17, wherein communicating the set temperature level to the second electronic processor includes communicating the set temperature to the second electronic processor via a controller area network (CAN) bus included in the vehicle.

20. The method of claim 17, further comprising communicating, via the first electronic processor, the set temperature level to at least one indicator included in the vehicle.

\* \* \* \* \*